United States Patent [19]

Jackson et al.

[11] 4,237,791

[45] Dec. 9, 1980

[54] RADIAL AXLE RAILWAY TRUCK DISC BRAKES

[75] Inventors: Keith L. Jackson, Granite City; James J. Reece, Belleville, both of Ill.

[73] Assignee: General Steel Industries, Inc., St. Louis, Mo.

[21] Appl. No.: 936,212

[22] Filed: Aug. 24, 1978

[51] Int. Cl.³ .............................. B61F 5/30; B61F 5/38; B61H 5/00; B61H 13/26
[52] U.S. Cl. ................................. 105/168; 105/182 R; 105/199 R; 105/224.1; 188/59; 188/153 A
[58] Field of Search ............ 105/165, 168, 176, 182 R, 105/199 R, 224 R, 224.1; 188/59, 70 R, 72.9, 153 A

[56] References Cited

U.S. PATENT DOCUMENTS

| | | | |
|---|---|---|---|
| 2,284,484 | 5/1942 | Eksergian | 188/59 |
| 2,352,222 | 6/1944 | Poque et al. | 188/59 X |
| 2,440,020 | 4/1948 | Pratt | 188/153 R |
| 3,314,505 | 4/1967 | Pelikan | 188/72.9 X |
| 3,344,893 | 10/1967 | Pelikan | 188/70 R X |
| 3,913,495 | 10/1975 | Pelabon | 105/199 R |
| 4,067,261 | 1/1978 | Scheffel | 105/176 |
| 4,131,069 | 12/1978 | List | 105/176 X |
| 4,134,343 | 1/1979 | Jackson | 105/199 R X |
| 4,151,801 | 5/1979 | Scheffel et al. | 105/224.1 X |

Primary Examiner—Howard Beltran
Attorney, Agent, or Firm—F. Travers Burgess

[57] ABSTRACT

A railway truck has a pair of radial axles with journal bearings at their ends and an adaptor mounted on each journal bearing and arranged to support the truck framing for steering movements of the respective axles with respect thereto, rigid links connecting the diagonally opposite axle bearing adaptors via bifurcated yokes to accommodate horizontal turning movements in opposite senses of the respective axles, the adaptors being mounted on the axle bearings to permit limited relative movement of the axle bearings and of the respective axles transversely of the truck with respect to the adaptors, whereby to permit the respective axles, while held in parallelism by the diagonal links, to move transversely of the truck with respect to each other sufficiently to follow transverse offsets in the track rails such as may occur at turnouts and the like without placing excessive strains on the bearing adaptors and linkages. A compatible disc brake system comprises a single disc at the center of each axle adapted to be frictionally engaged by opposing shoes of a disc brake mechanism supported by the bifurcated yoke, the nose of which is connected to the truck framing intermediate the axles to accommodate free pivoting movement of the brake mechanism in the horizontal plane in accordance with corresponding movements of the axles.

17 Claims, 8 Drawing Figures

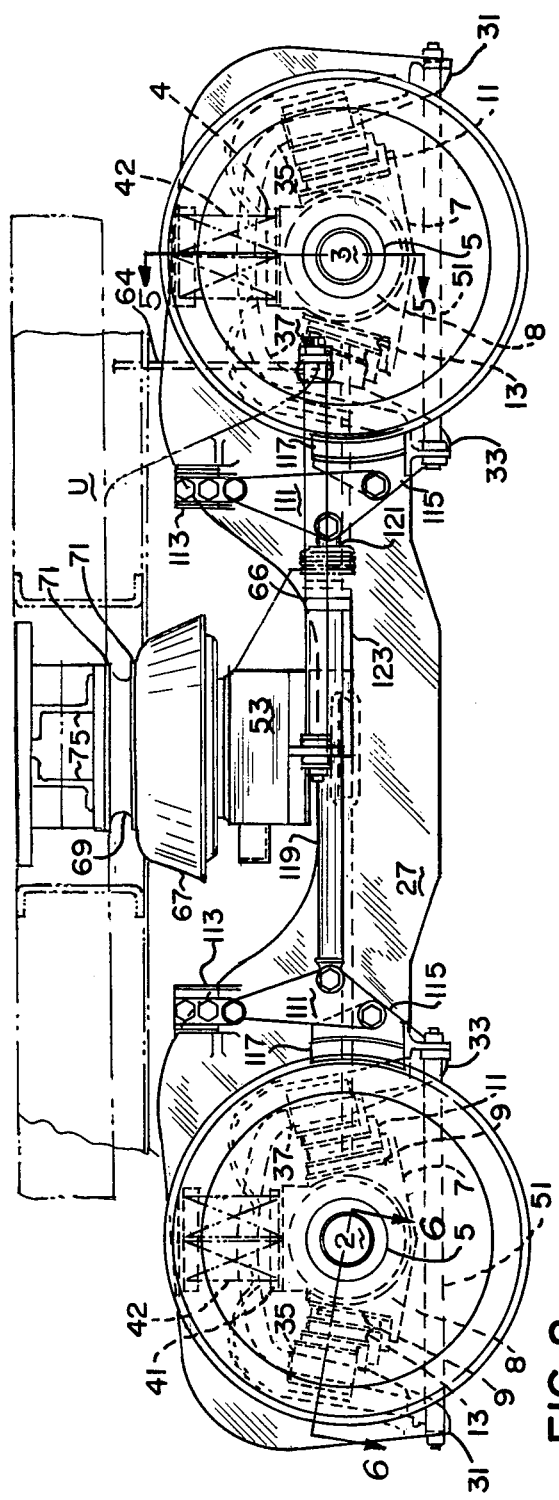
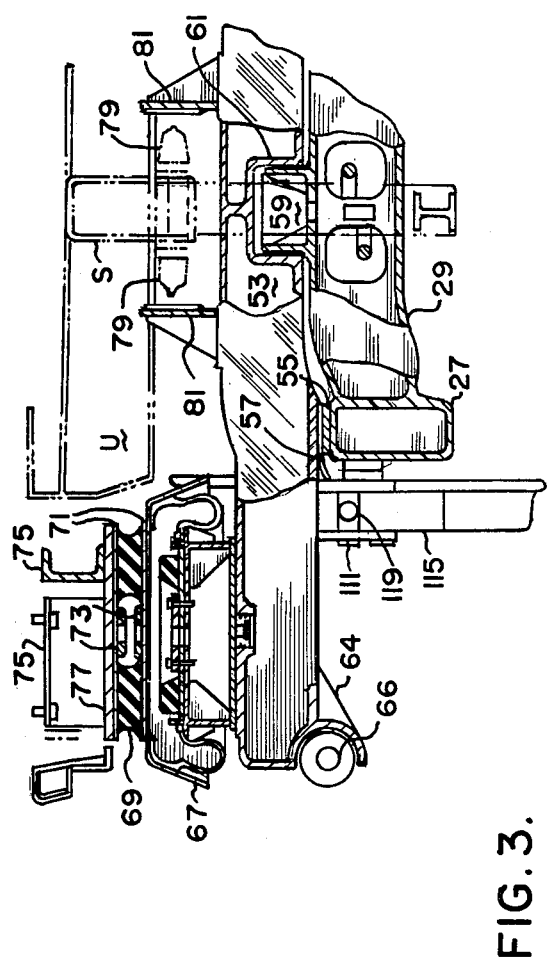
FIG. 2.
FIG. 3.

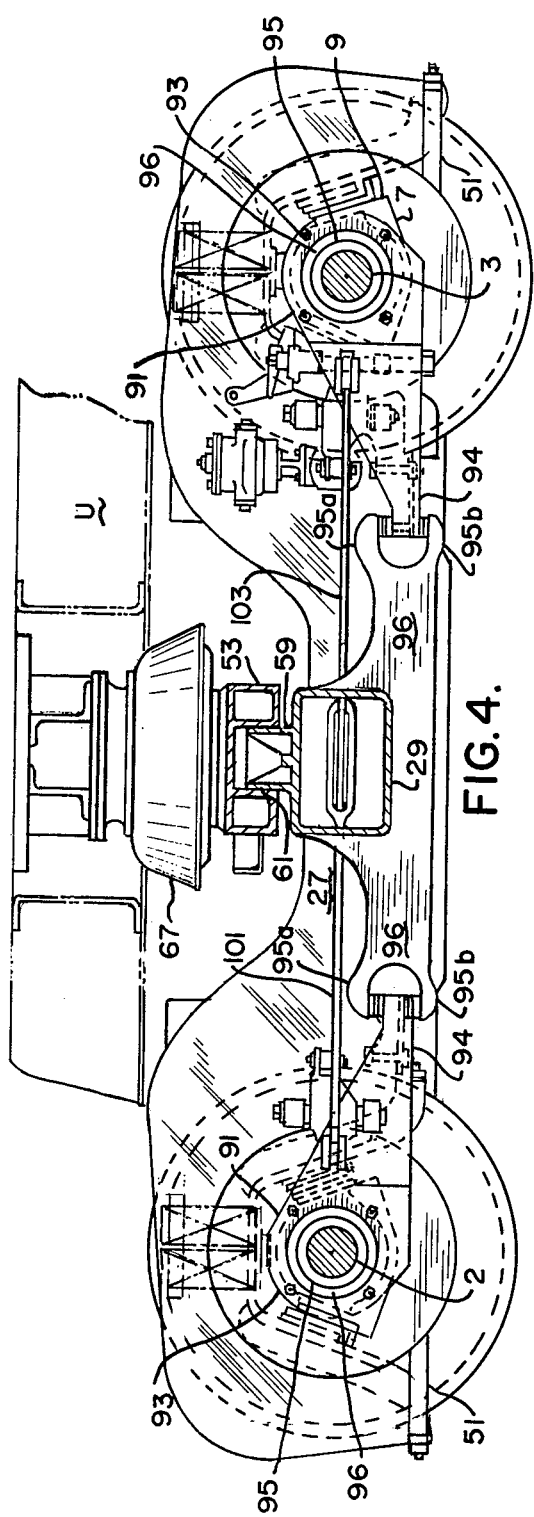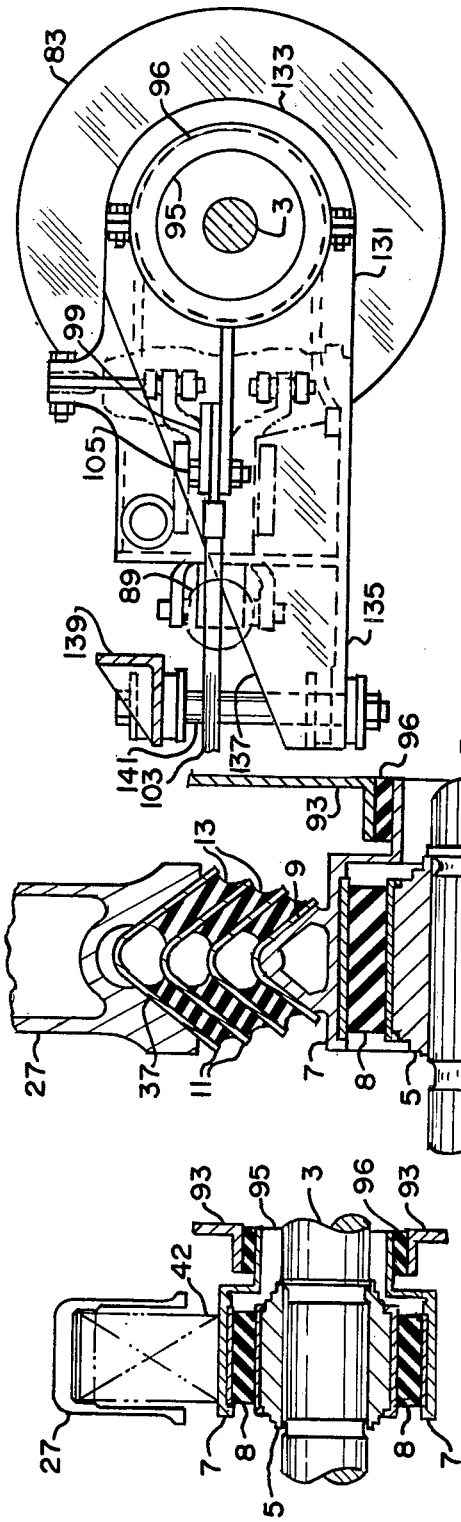

RADIAL AXLE RAILWAY TRUCK DISC BRAKES

BACKGROUND OF THE INVENTION

1. Field of the Invention

The invention relates to railway rolling stock and consists particularly in a radial axle truck with a compatible disc brake system.

2. The Prior Art

In prior two-axle railway trucks in which the axles are steerable to radial positions on curved track, as exemplified in Herbert Scheffel U.S. Pat. No. 4,067,261, particularly FIGS. 17-24 thereof, if substantially non-resilient linkages are used to connect the diagonally opposite axle bearings, the linkages will prevent the axles from moving transversely of the truck with respect to each other sufficiently to accommodate to transverse offsets in the track rails such as occur at turnouts, with the possibility of excessive strains on the bearing adaptors and linkages.

The use of a single disc mounted on the center of a railway axis for gripping engagement by shoes of a disc brake mechanism is exemplified in G. A. Pelikan U.S. Pat. No. 3,314,505, in which the disc brake mechanism is mounted on a transverse beam fixedly supported from the side frames of a truck. If this arrangement were applied to a radial axle truck, upon application of braking forces to the brake mechanism, the tendency of the latter would be to maintain the disc in its normal centered position which would be satisfactory on tangent track but would oppose radiation of the axles on curved track. In another patent to G. A. Pelikan, U.S. Pat. No. 3,344,893, a pair of discs having opposed slightly conical surfaces is mounted at the center of each axle and a wedge-shaped double-faced shoe mounted on a beam carried by the side frames is movable longitudinally toward the axle in the space between the opposed conical disc surfaces so as to brake the respective axle by wedging frictional engagement with the opposed conical surfaces. Because of the force exerted by this shoe device lengthwise of the truck, it too would tend to oppose the action of the wheel generated steering forces to cause radiation of the axles on curved track. B. Pratt U.S. Pat. No. 2,440,020 discloses a brake having three discs mounted in spaced relationship on the middle of each axle, the middle disc being rotatably mounted on the axle and providing a support for a brake mechanism having shoes engageable with the inner surface of the outer discs. The carrier disc and mechanism are provided with an arm extending toward the truck frame or bolster where it is supported by springs. If this arrangement were applied to a radial axle track, the application of unequal forces by the brake shoes to the separate discs on the respective axles would tend to oppose the steering forces on the respective axles and thus interfere with proper radial positioning of the respective axles on curved track.

REFERENCE TO RELATED APPLICATIONS

The present invention is an improvement over the invention disclosed in co-pending application of Keith L. Jackson, Ser. No. 744,620, filed Nov. 24, 1976, which issued Jan. 16, 1979 as U.S. Pat. No. 4,134,343.

SUMMARY OF THE INVENTION

The invention provides a radial axle truck with linked axles in which the axles have sufficient lateral play with respect to the linkages and each other to accommodate readily to transverse offsets in the track structure.

The invention provides a radial axle railway truck, in which the diagonally opposite ends of the respective wheel and axle assemblies are connected by rigid linkages, with means permitting movement of each axle with respect to the other transversely of the truck without interference from the rigid linkage connections.

The invention provides a radial axle truck in which the axle bearings are mounted in adaptors, which support the truck framing to permit steering movement of the respective axles, for movement transversely of the truck with respect to the adaptors and thus permits transverse movement of the axles with respect to each other in conformity with lateral irregularities in the track rails.

The invention provides a disc brake mechanism for radial axle trucks constructed and arranged to avoid interference with steering forces on the respective axles.

The invention provides a combined tread and disc brake system for radial axle trucks arranged to accommodate freely radiation of the axles on curved track responsive to steering forces applied to the axles.

According to the invention the disc brake comprises a disc mounted on the center of each axle, a disc brake mechanism having shoes engageable with the opposite faces of the disc and a supporting yoke for the mechanism of bifurcated form with the extremities of its arms pivotally mounted on the axle bearing adaptors of the respective axles and having a central nose extending longitudinally toward the center of the truck framing and supported therefrom to accommodate free pivoting movement of the brake mechanism in the horizontal plane while preventing substantial vertical movement of the nose with respect to the frame and thus resisting braking torque reactions without interfering with turning movements of the respective axle in the horizontal plane.

The foregoing and additional objects and advantages of the invention will be evident from the accompanying drawings and description.

BRIEF DESCRIPTION OF THE DRAWINGS

FIG. 2 is a side elevational view of the truck illustrated in FIG. 1 showing the compatible tread brake arrangement.

FIG. 3 is a transverse vertical sectional view along line 3—3 of FIG. 1.

FIG. 4 is a longitudinal vertical sectional view taken along line 4—4 of FIG. 1.

FIG. 5 is a fragmentary transverse vertical sectional view along line 5—5 of FIG. 2.

FIG. 6 is a fragmentary nearly horizontal sectional view taken along line 6—6 of FIG. 2.

FIG. 8 is a longitudinal vertical sectional view taken along line 8—8 of FIG. 7.

DETAILED DESCRIPTION OF THE INVENTION

Figure 1:
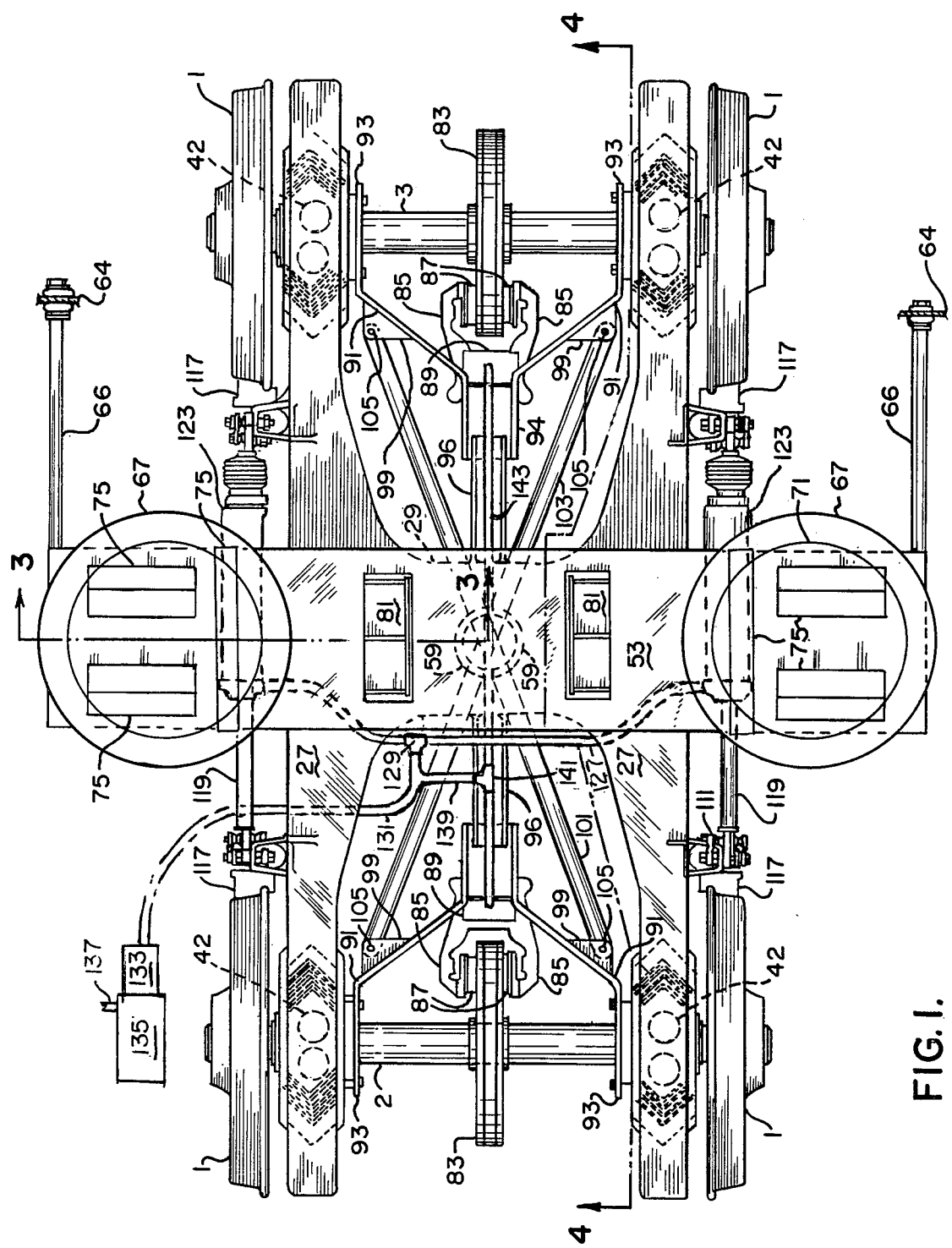
FIG. 1 is a plan view of a four-wheel railway truck equipped with a brake system constructed in accordance with the present invention, showing the brake piping schematically.

The truck illustrated in FIGS. 1-6 has a pair of spaced wheel and axle assemblies each comprising flanged wheels 1 mounted in gauged pairs on the ends of the respective axles 2 and 3. The effective conicity of the wheel tread profiles is sufficient to effect self-steering of each wheel and axle assembly by means of the differential effect between the wheel diameters of the outer and inner wheels on curved track and is substantially greater than the standard conicity of 1:20 or 0.05.

Inboard of the wheels each of the axles 2 and 3 mounts adjacent each wheel an axle bearing 5 on which is mounted an adaptor 7, the fore and aft surfaces 9 of each adaptor 7 being symmetrically inclined upwardly toward each other and being of acute V-shape in plan with their apices pointing away from the respective bearings 5. Corresponding V-shaped elastomeric pad devices comprising V-shaped metal plates 11 bonded to flat elastomeric pads 13 positioned between and opposing flat surfaces are secured to fore and aft surfaces 9 of the respective adaptor members 7.

To permit substantial movement of the axles and axle bearings 5 laterally of the truck with respect to the adaptors, for purposes which will appear more fully below, an annular elastomeric grommet 8 is clamped between the inner surfaces of each adaptor 7 and the outer surface of the respective bearing member 5 and is yieldable in shear.

A rigid truck frame comprises longitudinally extending transversely spaced side members 27 positioned generally transversely inwardly of wheels 1 and connected at their midpoints by a transversely extending transom member 29. The end portions of side members 27 are elevated over axles 2 and 3 and are formed with downwardly open pedestal jaws defined by depending pedestal legs 31 and 33 spaced apart longitudinally of the truck a substantially greater distance than the maximum dimension, longitudinally of the truck, of axle bearing adaptors 7, and the inner surfaces 35 and 37 of pedestal legs 31 and 33 are symmetrically inclined slightly toward each other upwardly in a direction longitudinally of the truck and are of concave V-shape with their apices 39 pointing away from the respective axles, such that the surfaces 35 and 37 of the pedestal legs are parallel to the outer surfaces 9 of the bearing adaptors and surfaces 35 and 37 are seated on the outer plates 11 of the elastomeric sandwich devices 11, 13. The top surfaces of adaptors 7 are provided with upwardly open spring seats 41 in which are seated upright metal coil springs 42 which extend upwardly into pockets in the end portions of truck frame side members 27, such that the truck frame side members are supported jointly by V-shaped elastomeric pad devices 11, 13 and coil springs 43. With this arrangement substantial turning movements of the axles in the horizontal plane with respect to the truck frame are accommodated through longitudinal shear in V-shaped elastomeric pad devices 11, 13 and by the transverse shear in elastomeric grommets 8 along with transverse and longitudinal deflections in coil springs 42. To oppose any tendencies of pedestal legs 31 and 33 to spread apart longitudinally of the truck due to the longitudinal components of the load applied through chevron pad devices 11, 13, the lower ends of the pedestal legs are secured to each other by tie bolts 51. From the foregoing, it will be seen that on tangent track the axles will be in the positions shown in the drawings, i.e., normal to the longitudinal axis of the truck, but when on curved track because of the differential effect of the conically profiled wheel treads, the axles will turn in the horizontal plane, thereby assuming positions radial of the track curve, such turning movements being freely accommodated by the yieldability in shear longitudinally of the truck of the elastomeric elements in chevron pad devices 11, 13, transversely of the truck by elastomeric grommets 8, and the horizontal yieldability of coil springs 42.

For supporting the car body and its underframe U on the truck such that the truck can swivel to accommodate track curvature, a transverse bolster 53, preferably a casting of box section, overlies truck frame transom 29 and is supported on the truck frame side members 27 by slidably engaged upwardly and downwardly facing horizontal bearings 55 and 57 on the truck frame and bolster respectively. For accommodating swivel of the truck frame with respect to the bolster and transmitting longitudinal forces between them, truck frame transom 29 is formed with an upstanding cylindrical bearing element 59 at its center, which is pivotally received in a downwardly open cylindrical recess 61 in the bottom of bolster 53.

The end portions 63 of the bolster extend outwardly from truck frame side members and have flat upwardly facing spring seat surfaces 65 on which are seated vertically and transversely yieldable pneumatic spring devices 67. An elastomeric sandwich device comprising an annular elastomeric pad 69 and annular boundary plates 71 is seated on top of each spring device 67 and held against horizontal movement with respect thereto by engagement of an upstanding annular boss 73 with the central aperture in bottom plate 71. The car underframe U mounts adaptors 75 at each side, each adaptor 75 having a downwardly facing spring cap plate 77 formed with a depending boss 73, adaptor plates 77 being seated on top of the respective elastomeric sandwich devices 69, 71 with depending bosses 73 received in the openings in the respective annular plates 71.

For limiting lateral movement of underframe U with respect to the bolster 53, the underframe center sill S mounts a pair of transversely outwardly facing elastomeric bumpers 79 aligned with each truck bolster 53, and each truck bolster 53 is formed with a pair of transversely spaced and inwardly facing upstanding abutments 81 normally spaced from bumpers 79 and adapted to engage the latter as the limit of lateral motion is approached.

For transmitting longitudinal braking and traction forces between the truck bolster and the car underframe while permitting relative vertical and transverse movements therebetween, both extremities of the bolster are provided with depending brackets 64 to which are pivotally secured longitudinally extending anchor links 66, the opposite ends of each of which are pivotally secured at 68 to bracket structure 70 depending from car underframe U.

An improved disc brake arrangement compatible with the steering movements of each axle includes a single disc 83 mounted at the center of each axle 2 and 3, and a fluid operated mechanism comprising a pair of levers 85 on both sides of the disc mounting shoes 87 engageable with the respective sides of the disc, and a pneumatic or hydraulic cylinder 89 for spreading the levers 83 and thereby moving the shoes into frictional engagement with the disc surfaces.

For supporting each brake mechanism 85, 87, 89 and taking its torque reaction without interference with wheel-induced steering movements of the respective axles, a bifurcated brake support yoke comprises separate side members 91 having annular terminals 93 with their openings 94 pivotally receiving inboard annular flanges 95 of axle box adaptors 7 for slight pivotal movement about the annular flanges 95 which are concentric with the respective axles 2 and 3. Preferably, elastomeric bushings 96 are interposed between adaptor flanges 95 and yoke terminals 93 to eliminate metal-to-metal contact and consequent wear. Yoke side members 91 converge toward each other between the respective axle and the center transom 29 to support the brake mechanism 85, 87, 89 and are united to form a centrally positioned nose portion 94. Nose portion 94 extends longitudinally of the truck toward center transom 29 and is received between vertically bifurcated branches 95a and 95b of a bracket 96 extending longitudinally from the center transom toward the respective axles, the vertical spacing between branches 95a and 95b being sufficiently greater than the vertical thickness of brake support yoke nose portion 93 to permit the insertion above and below the latter of elastomeric pad devices 97, which through their resistance to vertical compression prevents substantial vertical movement of brake support yoke nose portion 93 and thus resists brake torque reactions while freely accommodating, through horizontal shear in pad devices 97, all turning movements of the respective axle in the horizontal plane.

Substantially at axle level at the intersection of brake yoke arm 93 and tube 91 are formed clevis-like brackets 99 and the diagonally opposed brackets on the two brake frames are connected by rigid diagonal links 101 and 103, the ends of which are pivotally secured by pin connection 105 to the respective brackets. Diagonal links 101 and 103 couple the wheel induced steering movements of the individual wheel and axle assemblies to cause their symmetrical turning movements in opposite directions on curved track and cooperate with the resistance offered by pad devices 11, 13 and 41 to oppose hunting movements of the wheel and axle assemblies on tangent track.

Preferably, the truck also includes a tread brake arrangement co-operating with the disc brake system described above for braking the truck irrespective of whether the axles are parallel as on tangent track or steered in opposite senses as on curved track. The tread brake rigging at each side of the truck comprises a pair of substantially vertical brake levers 111 pivotally depending from outboard brackets 113 on the truck frame side members 27 and pivotally mounting at their lower ends brake heads 115 carrying the usual shoes 117 engageable with the adjacent wheel treads. Intermediate their lower ends levers 111 are connected respectively to a pair of aligned rods 119 and 121 extending longitudinally of the truck, rod 119 mounting a hydraulic cylinder 123 and rod 121 being connected to a piston (not shown) in cylinder 123. As best seen in FIG. 1, the cylinders 123 on opposite sides of the truck are connected by a transverse hydraulic conduit 127 which is connected intermediate its ends by a tee 129 to a conduit 131 connected at its other end to hydraulic booster 133 driven by pneumatic cylinder 135 which communicates with the car air brake system by conduit 137. A branch 139 of hydraulic brake line 131 communicates via a tee 141 with a conduit 143 leading to both disc brake cylinders 89. With this arrangement, when the car air brake system is actuated, air is admitted to penumatic cylinder 135 to actuate hydraulic booster cylinder 133, creating hydraulic pressure in conduit 131 and its branch 139 and in tread brake conduit 127 and disc brake conduit 141, causing simultaneous application both of the tread and disc brakes. Because of the interconnection by means of conduit 127 of tread brake hydraulic cylinders 119 at each side of the truck, the tread brakes at both sides will be equalized irrespective of yaw of the axles on curved track when the wheel treads on the inside of the curve would be substantially closer to each other than those on the outside of the curves so that even when the axles are substantially radial of the curve, equal brake pressure would be applied to each wheel tread. The interconnection of disc brake cylinders 89 by means of conduit 143 also assures that the pressure on both disc brake cylinders will be equalized.

Operation of the truck incorporating the invention is as follows: While moving along tangent track, all tendencies of the individual axles to oscillate about vertical axes or to move lengthwise with respect to the truck frame are resisted by the resistance of elastomeric pad devices 11, 13 to shear and compression longitudinally of the truck, and diagonal links 101 and 103 co-operate with the resistance offered by pad devices 11, 13 to oppose any such oscillation or hunting movements of the individual axles. Although diagonal links 101 and 103 tend to keep the axles 2 and 3 parallel and to keep the axle bearing adaptors on both axles aligned during movements on tangent track, by reason of having links 101 and 103 connected to the adaptors 7 instead of to the axle bearings 5 and having the axle bearings 5 laterally movable in the adaptors 7 the axles, even though held parallel, are permitted to move laterally with respect to each other, so that the wheels may adjust to lateral offsets in the track rails. When moving along curved track, the conically profiled wheel treads, by reason of the differential engagement of the inner and outer treads with the respective track rails, induce self-steering turning movements in the individual axles which are accommodated by the shear yieldability of V-shaped elastomeric pad devices 11, 13 and of elastomeric grommets 8 which, in turn, being coupled to each other to accommodate symmetrical turning movements in opposite senses of the individual axles, thus avoid interference with the self-steering capability of the respective wheel and axle assemblies which are thereby positioned substantially radially with respect to the track curvature.

If the brakes are applied by admission of fluid to cylinders 89, causing shoes 87 to grippingly engage the discs 83, no forces will be applied by the brakes to the axles tending, on tangent track, to cause the axles to turn in the horizontal plane nor on curved track, tending to cause the axles to return to their normal tangent track positions, nor will the application of braking forces while the vehicle is on tangent track prevent the axles from assuming their curved track positions upon entering a curve nor, if the brakes are applied while the vehicle is on curved track, the brake application will not interfere with the return of the axles to their tangent track position by reason of the elastomeric reaction connection of nose 94 to frame bracket 96, whereby the brake support yoke is always free to turn in the horizontal plane in accordance with turning movements of the axle in a horizontal plane through horizontal shear in elastomeric pads 97, which however oppose vertical movements of the yoke nose by their resistance to compression. If tread brakes of the type shown are also used in combination with the disc brakes, the admission of fluid to the tread brake cylinders may be controlled by a common master cylinder and, in view of the transverse interconnection between the tread brake cylinders at opposite sides of the truck, the tread brake mechanisms at both sides will assume the same length on tangent trackage so as to apply equal shoe pressure on all four wheel treads, but on curved trackage the outboard mechanism will be lengthened and the inboard mechanism shortened in accordance with relative longitudinal spacing of the inboard and outboard wheels caused by the steering action of the conical wheel treads and similarly shoe pressure on all four wheels will be equal and will not interfere with the steering forces generated by the differential engagement of the wheel treads with the inner and outer track rails.

Figure 7:
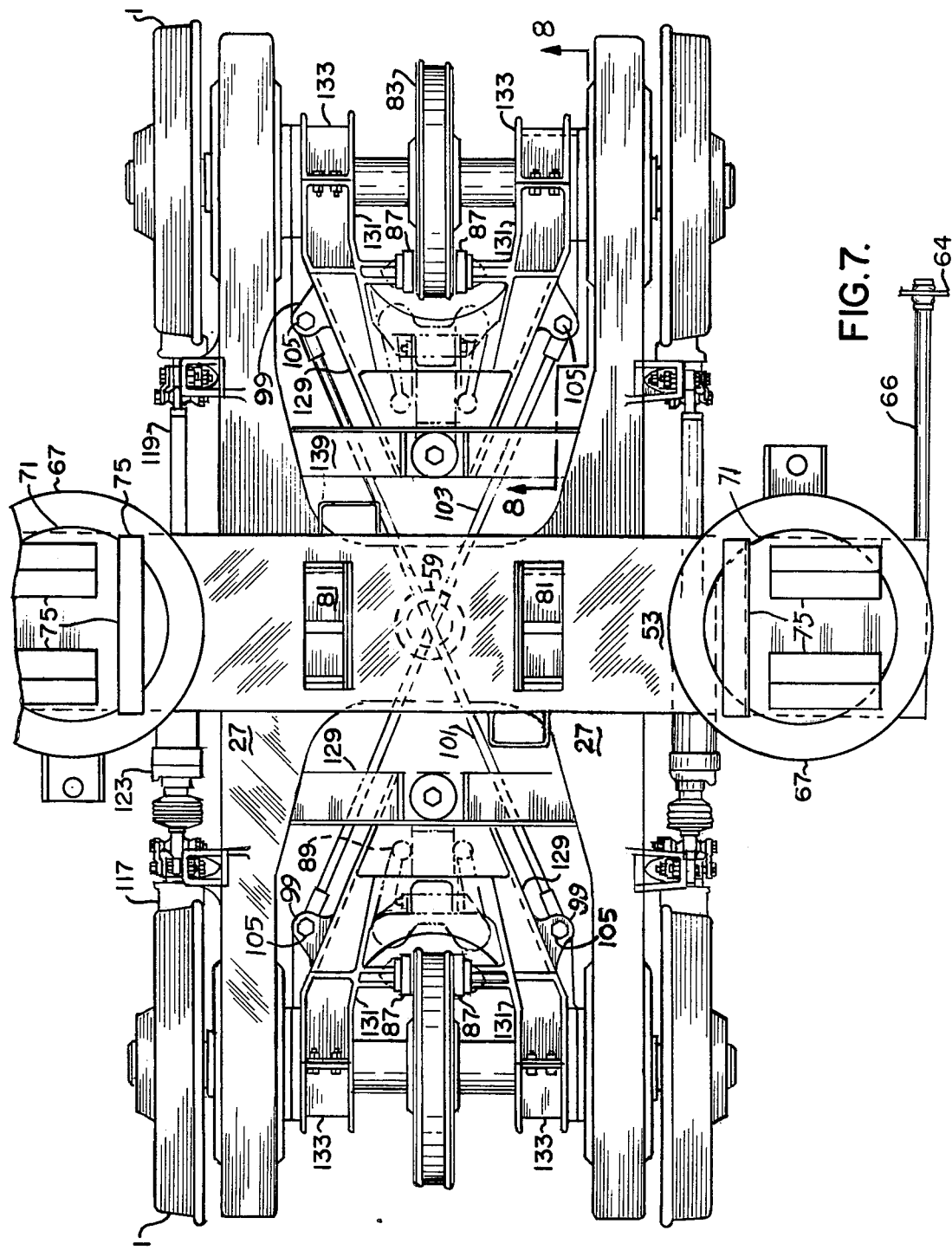
FIG. 7 is a plan view of a four wheel railway truck generally similar to that illustrated in FIGS. 1-6, but having different brake support arrangement.

In the embodiment of the truck illustrated in FIGS. 7 and 8, the brake mechanism supporting yoke comprises a bifurcated casting having a mechanism supporting body portion 129 formed with transversely spaced longitudinally extending side members 131 to which end members 133 are bolted to form a pivotal mounting on adaptor flanges 95, as in FIGS. 5 and 6, and the body 129 of the yoke tapers inwardly toward center transom 29, its inner end portion being formed with a horizontal bottom web 135 and vertical side webs 137. For supporting the nose portion 115, 117 thus formed of the brake supporting yokes from the truck frame and taking braking torque reactions into the truck frame, transversely extending angle bars 139 are secured, as by welding, at their opposite ends to the inner surfaces of truck frame side members 27, directly above the inner ends of nose portions 135, 137 and a vertically extending hanger 141 is pivotally secured at its upper end to a horizontal web of angle bar 119 and at its lower end to web 135 of the brake mechanism support yoke such that when the axles are moved to radial positions by wheel-generated steering forces, the nose portion 135, 137 of the yoke will be free to move in an arc primarily transversely of the truck through the swingability of hanger 141 and hence will offer no interference with the steering movements of the axle. Operation of a truck incorporating the brake support yoke structure of FIGS. 7 and 8 will be similar to the operation described above except that in the embodiment of FIGS. 7 and 8 arcuate movements of the yoke nose will be accommodated by swinging principally transversely of the truck of the hanger 121.

The details of the truck including the axle suspension and brake mechanism described herein may be varied substantially without departing from the spirit of the invention and the exclusive use of such modifications as come within the scope of the appended claims is contemplated.

We claim:

1. In a railway truck having a pair of longitudinally spaced wheel and axle assemblies each comprising an axle and a pair of wheels mounted thereon, journal bearings supported on the end portions of said wheel and axle assemblies at each side of the truck, adaptors mounted on the respective journal bearings, truck framing, means supporting said truck framing on said adaptors and permitting said wheel and axle assemblies to turn in the horizontal plane with respect to said truck framing, means including separate structures rigidly connecting both journal bearing adaptors on the respective axles forming operative interconnections between the diagonally opposite journal bearing adaptors causing the respective wheel and axle assemblies to turn in opposite senses in the horizontal plane while positively holding the journal bearing adaptors at each side in alignment with each other longitudinally of the truck, said adaptors being mounted on said journal bearings to permit movement transversely of the truck of said journal bearings with respect to said adaptors whereby to accommodate corresponding lateral movements of each said axle with respect to the other axle as may be required to allow the wheels to move laterally to follow lateral offsets in the track rails irrespective of the resistance of said interconnection means to relative transverse movements of the journal bearing adaptors associated with the respective axles.

2. In a railway truck according to claim 1, said interconnection means comprising a pair of rigid links pivotally connected at their opposite ends to diagonally opposite sides of the respective journal bearing adaptor connecting structures.

3. In a railway truck according to claim 1, each said journal bearing having cylindrical peripheral surface means and each said adaptor having a cylindrical aperture through it of slightly greater diameter than said bearing surface means and an annular elastomeric grommet positioned in the annular space between said journal bearing surface means and said adaptor aperture and being yieldable in shear to accommodate lateral movement of said journal bearing with respect to said adaptor while preventing substantial radial movement of said journal bearing with respect to said adaptor by reason of the resistance of said grommet to compression.

4. In a railway truck according to claim 1, said wheels being formed with treads of higher than conventional conicity whereby the differential diameters of said wheels engaging the opposite rail heads on curved track generates steering forces tending to position said axles radially of track curvature and to maintain said axles transverse of the track on tangent track.

5. In a railway truck according to claim 2, a brake disc mounted at the center of an axle, each of said adaptor connecting structures comprising a yoke having side members mounted on the journal bearing adaptors of the respective axles for limited pivotal movement about said axles and having a nose portion extending toward the center of the truck framing from the respective axle and means supporting said nose portion from said truck framing and opposing vertical movements of said nose portion with respect to said truck framing while avoiding interference with movements of said nose portion in the horizontal plane, and disc brake mechanism including opposing shoes positioned on opposite sides of said disc mounted on said yoke, said yoke nose portion and supporting means forming a brake reaction connection of said yoke to said truck framing.

6. In a railway truck according to claim 5, the pivotal connections of said diagonal links to said journal bearing adaptors being by direct pivotal connections to the sides of said brake mechanism yokes.

7. In a railway truck according to claim 5, each said journal bearing being of cylindrical shape and each said adaptor being formed with a cylindrical aperture receiving said journal bearing and being of slightly larger diameter than said journal bearing and an annular elastomeric grommet positioned between said adaptor and said journal bearing and permitting relative lateral movement of said journal bearing with respect to said adaptor by its yieldability in shear while resisting radial movement of said journal bearing in said adaptor by its resistance to compression.

8. In a railway truck according to claim 5, said means supporting said yoke nose portion from said truck framing comprising vertically spaced opposed surfaces on said truck framing receiving said yoke nose portion between them and elastomeric pad devices positioned between said yoke nose portion and the respective opposing surfaces and yieldable in shear to permit horizontal movements of said yoke nose portion with respect to said framing while opposing vertical movements of said yoke nose portion by the resistance of said pad devices to compression.

9. In a railway truck according to claim 8, said means supporting said yoke nose portion from said truck framing comprising a substantially vertical link pivotally connected at its one end to said framing and at its other end to said yoke nose portion.

10. In a railway truck according to claim 5, said adaptor being formed with an inboard annular flange and said yoke side members being formed with annular terminals pivotally receiving the respective adaptor flanges.

11. In a railway truck according to claim 10, an annular sleeve of elastomeric material positioned between said adaptor flanges and said yoke annular terminals to accommodate slight pivotal movements of said yoke about the respective axles through circumferential shear in the elastomeric sleeves while resisting radial movements of said yoke annular terminals with respect to said axle through the resistance of said elastomeric sleeve to compression.

12. In a railway truck, a pair of longitudinally spaced wheel and axle assemblies each comprising an axle and a pair of wheels mounted thereon, truck framing, means resiliently supporting said truck framing on the end portions of said wheel and axle assemblies and permitting said wheel and axle assemblies to turn in a horizontal plane with respect to said truck framing, a brake disc mounted on the central portion of an axle, a yoke having side members supported on the end portions of said axle, disc brake mechanism mounted on said yoke and having shoes movable transversely of the truck for selective frictional engagement with opposite sides of said disc, and means for transmitting braking torque reactions from said yoke to said truck framing while facilitating turning movements in the horizontal plane of said yoke with respect to said truck framing in accordance with turning movements of the associated wheel and axle assembly.

13. In a railway truck according to claim 12, a tread brake comprising substantially upright levers pivotally suspended from the sides of said truck framing adjacent the wheels longitudinally inboard thereof, brake shoes carried by said levers and engageable with the respective wheel treads responsive to longitudinal separation of said levers, an extensible rod device connecting said levers and including a cylinder connected to one of said levers and a piston therein connected to the other of said levers and a hydraulic interconnection between said cylinders at opposite sides of the truck whereby to positively equalize braking pressure on the separate brake shoes on both sides of the truck irrespective of variations in the longitudinal spacing of the wheels on the opposite sides of the truck resulting from steering movements of said wheel and axle assemblies.

14. In a railway truck according to claim 12, said braking torque transmitting means comprising a nose portion on said yoke extending away from the associated axle toward the center of the truck and means supporting said nose portion from said truck framing for arcuate movement transversely of the truck while resisting substantial vertical movement of said nose portion.

15. In a railway truck according to claim 14, said nose portion supporting means comprising a substantially vertical link supported at one end from the truck framing and having its other end pivotally connected to said nose portion.

16. In a railway truck according to claim 14, said nose portion supporting means comprising vertically spaced opposed surfaces on said truck framing receiving said nose portion between them.

17. In a railway truck according to claim 16, elastomeric pad devices positioned between said nose portion and said respective opposing surfaces and being freely yieldable in shear to permit horizontal movements of said nose portion with respect to said framing while opposing vertical movements of said nose portion by the resistance of said pad devices to compression.

* * * * *